March 8, 1966 V. K. ELORANTA 3,238,858
SELF-DEVELOPING CAMERA

Filed March 2, 1964 3 Sheets-Sheet 1

INVENTOR.
Vaito K. Eloranta
BY Brown and Mikulka
and
Robert E. Corb
ATTORNEYS

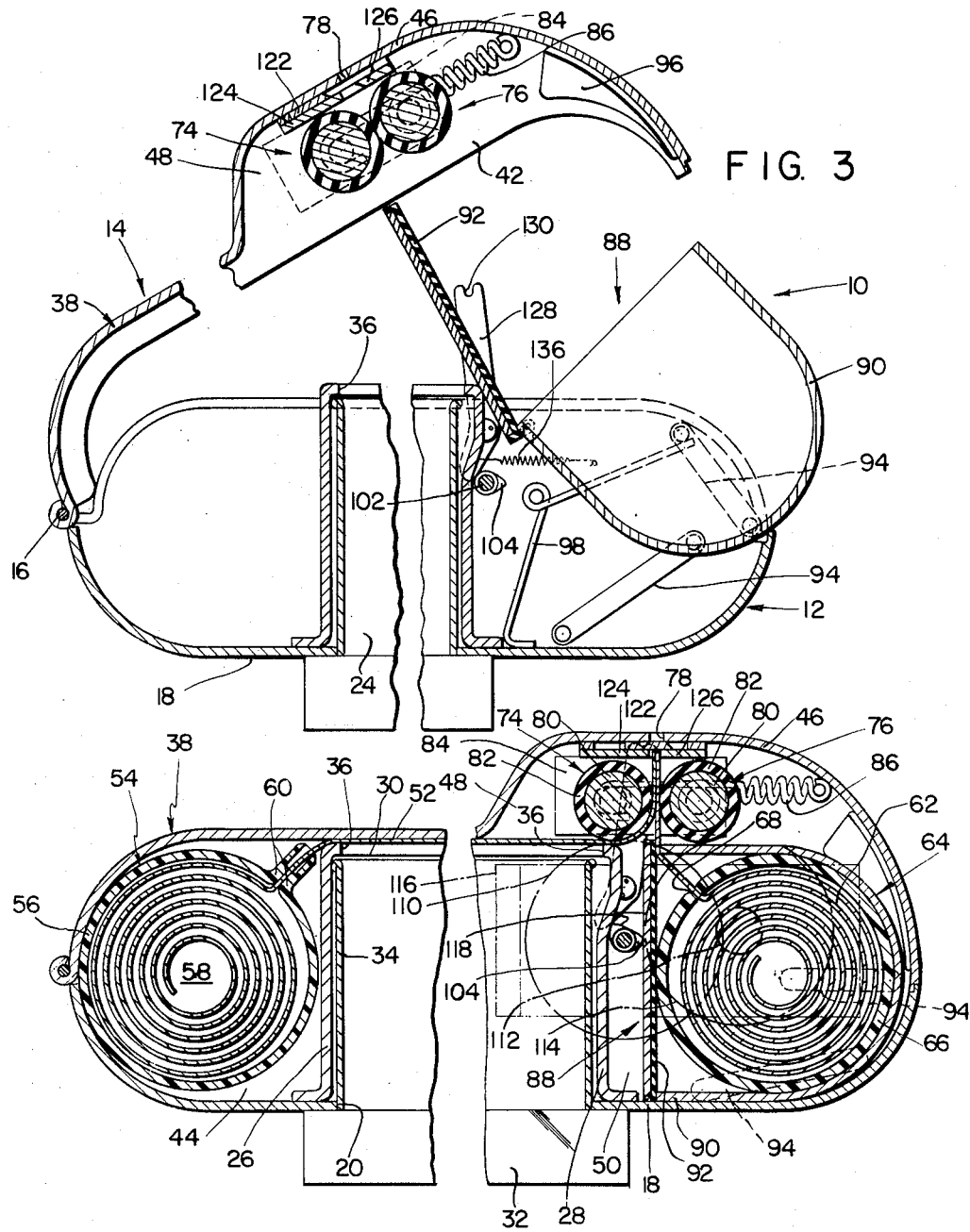

March 8, 1966    V. K. ELORANTA    3,238,858
SELF-DEVELOPING CAMERA
Filed March 2, 1964    3 Sheets-Sheet 3

INVENTOR.
Vaito K. Eloranta
BY Brown and Mikulka
and Robert E. Corb
ATTORNEYS

United States Patent Office 3,238,858
Patented Mar. 8, 1966

---

3,238,858
SELF-DEVELOPING CAMERA
Vaito K. Eloranta, Needham, Mass., assignor to Polaroid Corporation, Cambridge, Mass., a corporation of Delaware
Filed Mar. 2, 1964, Ser. No. 348,361
10 Claims. (Cl. 95—13)

This invention relates to self-developing cameras and particularly to a camera for exposing successive areas of a photosensitive image-recording sheet and treating the exposed areas with a liquid agent in conjunction with a second sheet.

In the copending U.S. patent application of Vaito K. Eloranta, Serial No. 298,969, filed July 31, 1963, there is shown and described photographic apparatus in the form of a camera in which successive areas of an image-recording sheet are exposed and thereafter processed to produce positive transfer prints on a second sheet. The second sheet is impregnated with a liquid processing agent and is stored within a container within the camera; and processing of each successive exposed area is accomplished by withdrawing a portion of the liquid impregnated second sheet from the container and pressing it into contact with the exposed area of the image-recording sheet. The container is maintained in a closed and sealed condition except during withdrawal movement of the second sheet and the two sheets are pressed into contact by advancing them in superposition between a pair of pressure-applying members, preferably rolls having pliant surfaces.

An object of the invention is to provide a novel and improved camera of the type described which, in response to manual movement of a single drive member, automatically performs substantially all of the operations involved in the treatment of each of a succession of exposed areas of a photosensitive image-recording sheet including opening a container, withdrawing a portion of a liquid impregnated second sheet from the container, pressing the exposed area and portion into contact to form a sandwich, advancing the sandwich from the apparatus, closing the container and severing the section of the sandwich including the exposed area from the remainder of the sheets.

As pointed out in the aforementioned application, the camera is designed to perform a photographic process in which successive areas of an image-recording or negative sheet are exposed to form images (latent), and a section of a second or image-receiving sheet, including an image-receiving layer impregnated with a liquid processing agent, is withdrawn from a container and pressed into contact with each exposed area to form an image on the second sheet in terms of image-forming substances transferred by diffusion from the image-recording sheet. The liquid processing agent carried by the second sheet is highly alkaline and must be kept in a closed and sealed container until immediately prior to pressing the second sheet into face-to-face contact with the exposed image-recording sheet. The two sheets include layers of or are formed of materials opaque to actinic light so that the two sheets can be pressed into contact to form a sandwich which can be advanced directly from the camera into the light where the sandwich including exposed areas is separated from the remainder of the sheets within the camera and is maintained intact for a processing period of predetermined duration at the end of which the two sheets are separated.

Another object of the invention is to provide a camera as described including a novel and improved container construction which facilitates loading of sheet materials, particularly a liquid impregnated second sheet, into the camera, and maintains the liquid impregnated sheet in a sealed container except during withdrawal of the sheet.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a sectional view taken substantially midway between the sides of the camera of FIGURE 1, shown loaded with photographic film assemblage;

FIG. 3 is a perspective view, similar to FIG. 2, showing the camera with the housing thereof in an open position;

Figure 1:
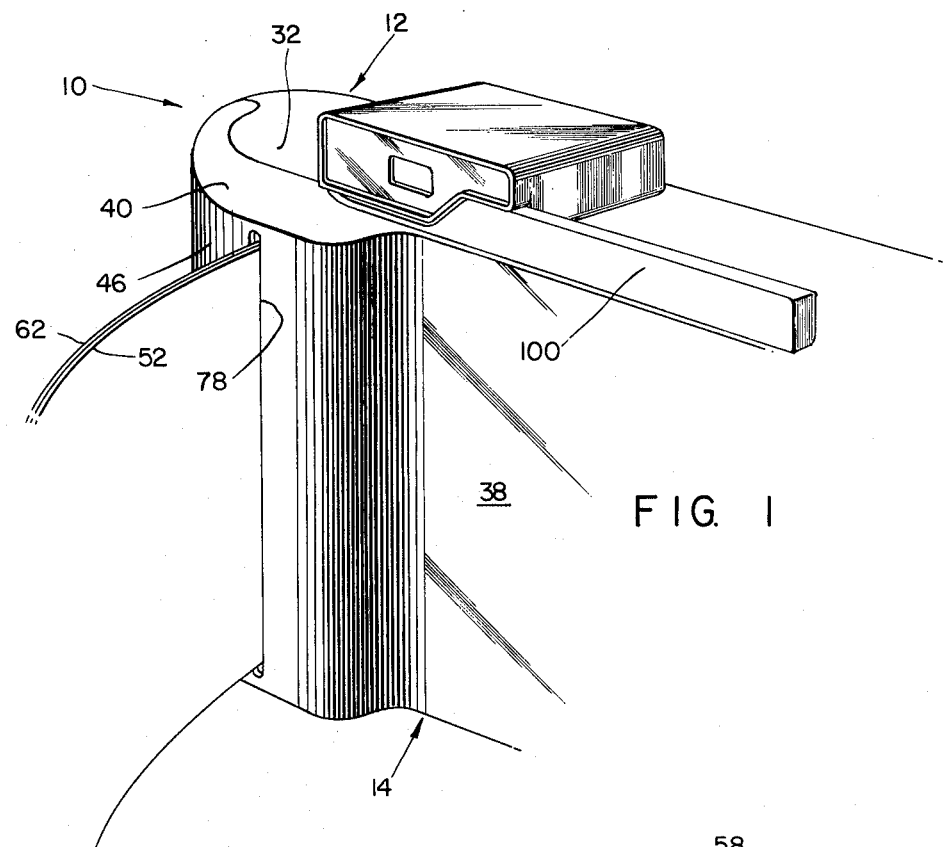
FIGURE 1 is a fragmentary perspective view of a portion of the rear of a camera embodying the invention.

A camera 10 embodying the invention is illustrated in FIGS. 1 through 4 as comprising a housing including a forward section 12 and a rear section 14 pivotally connected to one another at a hinge 16 for movement from a closed or operative position shown in FIG. 2, at which said camera can be employed to expose and process an image-recording sheet, to an open or inoperative position such as shown in FIG. 3, at which said camera may be loaded with sheet materials. The forward housing section includes a forward wall 18 curved rearwardly at its ends and having a centrally located and generally rectangular opening 20; upper and lower side walls 22 and 24; and a recessed section within opening 20 comprising rearwardly extending end walls 26 and 28 and a rear wall 30, the end walls being joined to forward wall 18 adjacent opposite ends of opening 20 and to rear wall 30. The camera includes a conventional lens and shutter assembly designated 32 shown coupled to rear wall 30 by a conventional rigid telescoping bellows 34. The rear surface of rear wall 30 is preferably located at the focal surface of the lens of assembly 32 for supporting an image-recording sheet in position for exposure to light transmitted through a generally rectangular exposure aperture 36 formed in rear wall 30. A suitable erecting system (not shown) is provided for coupling assembly 32 with the camera housing; or the lens and shutter assembly may be mounted on a rigid, telescoping type of bellows mounted within the recessed section defined by the upper and lower side walls, end walls 26 and 28 and rear wall 30. A conventional view-finder (and range-finder) 37 is mounted on upper wall 22.

Rear housing section 14 comprises a rear wall 38 curved forwardly at its ends to join with the ends of forward wall 18, and upper and lower side walls 40 and 42 adapted to join with upper and lower side walls 22 and 24 to form a light-tight housing in the closed position of the housing sections. Rear wall 38 includes a generally planar section for supporting sections of an image-receiving sheet in position for exposure against rear wall 30 across exposure aperture 36. The sections of forward wall 18 and rear wall 38 at one end of the camera cooperate with sections of upper side walls 22 and 40, rear side walls 24 and 42 and end wall 26 to provide a storage chamber 44 for containing a supply of a photosensitive image-recording sheet. Rear wall 38 includes a rearwardly extending section 46 cooperating with upper end lower side walls 40 and 42 to provide a chamber 48 at the rear of the housing for enclosing means for pressing the image-recording sheet into face-to-face contact with a liquid impregnated second sheet to form a sandwich and advancing the sandwich from the camera. Portions of the two housing sections also cooperate to provide a chamber designated 50 at the end of the housing opposite chamber 44 for enclosing other components of the apparatus and containing a supply of the liquid impregnated second sheet. It will be apparent from the drawings and the foregoing description that movement of the housing sections into the inoperative position shown provides unrestricted access to the various chambers and components of the apparatus to permit loading of the sheet materials into the apparatus and threading of portions of the sheets or a leader attached thereto between the juxtaposed members which press the two sheets into superposition.

The photosensitive image-recording sheet designated 52 is preferably of a length including a plurality of areas adapted to be photoexposed and processed to produce transfer prints and, in the form shown, is supplied in a coiled condition in a light-tight container 54. Container 54 is constructed to fit within chamber 44 and includes a generally cylindrical wall 56 and end walls 58 and a pair of lips 60 on wall 56 defining a passage through which successive sections of the coiled image-recording sheet can be withdrawn from container 54.

Figure 5:
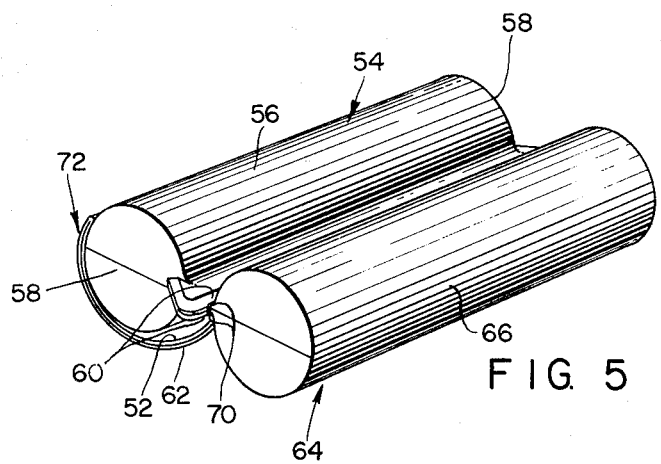
FIG. 5 is a perspective view partially in section of a photographic film assemblage of the type employed in the camera.
Figure 4:
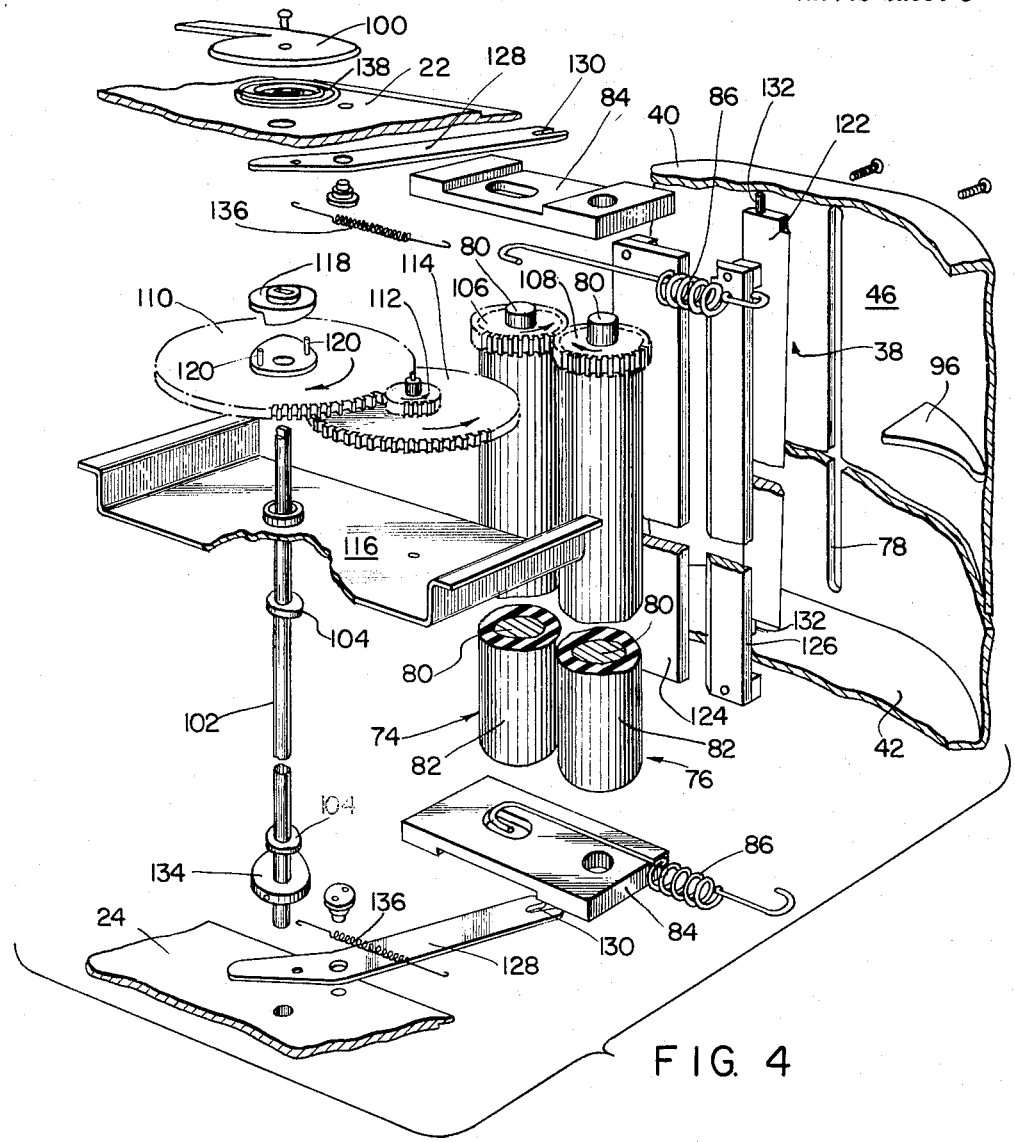
FIG. 4 is an exploded perspective view of the mechanism of the camera.

A second or image-receiving sheet 62 including a plurality of areas adapted to be superposed with the exposed areas of the image-recording sheet, is provided in a generally cylindrical container 64 including a cylindrical wall 66 having an axial slot 68 through which the second sheet may be withdrawn from container 64. The image-recording and second sheets and container therefor preferably comprise a film assemblage of the type shown and described more fully in the copending U.S. patent application of Ezio Cotta et al., Serial No. 310,381, filed September 20, 1963. In this form of film assemblage (see FIG. 5) container 64 is provided with a pair of lips 70 located adjacent opposite sides of slot 68 and formed integrally with cylindrical wall 66. The leading end of the second sheet is engaged between lips 70 which are sealed to one another so that container 64 is closed and lips 70 are coupled with the second sheet. Lips 70 are also coupled with a leader 72 coupled with image-recording sheet 52, and are engaged between lips 60 which function as a tool for bending lips 70 at cylindrical wall 66 so as to break lips 70 away from the cylindrical wall and permit the withdrawal of the second sheet from container 64.

As a means for pressing successive exposed areas of the photosensitive sheet into superposition with successive areas of the liquid impregnated image-receiving sheet, the camera includes a pair of pressure-applying members in the form of rolls 74 and 76 mounted in juxtaposition with one another with their axes substantially in a common plane within chamber 48 and roll 74 located adjacent an end edge of exposure aperture 36. Section 46 of rear wall 38 is formed with an exit slot 78 aligned with contiguous sections of the two rolls and permits advancement of a sandwich comprising the superposed sheets from between the rolls from the housing. The sheets are advanced into superposition and from the housing through slot 78 by rotating one or both of rolls 74 and 76 in engagement with the sheets. To promote the advancement of the sheets by frictional engagement with the rolls, each of the rolls, in the form shown, may comprise a support shaft designated 80 provided with a cover 82 of a elastomeric material, particularly foamed elastomers, for example, polyurethane foam, having a high coefficient in friction. Rolls 74 and 76 are mounted for rotation on support plates 84 in turn mounted on upper and lower side walls 40 and 42 within chamber 48 with roll 74 being supported in slots in the support plates for movement in the plane of the roll axes toward and away from roll 76. Springs 86 are provided for urging roll 74 toward roll 76 so as to apply compressive pressure to the sheets during movement of the sheet between the rolls.

As previously noted, image-receiving sheet 62, in the preferred form, is impregnated with a highly alkaline aqueous liquid and is required to be kept in a sealed container to prevent loss, as by evaporation, of the liquid to maintain the alkalinity of the liquid, and to prevent other chemical changes, such as oxidation, in the liquid. The camera includes a container generally designated 88 for holding the liquid-impregnated second sheet and means for holding the container in a closed and sealed condition except during withdrawal movement of a portion of the liquid-impregnated second sheet. Container 88 comprises a body 90 having a U-shaped peripheral wall and end walls defining an open chamber, and a closure 92 in the form of a rectangular panel covered on one side with a pliant material, such as an elastomer, and is adapted to be pressed against the edges of the peripheral and end walls of the body to close and seal the chamber defined by the body. Closure 92 is mounted at its forward edge on body 90 for pivotal movement with respect to the body between a closed position shown in FIG. 2 at which the closure is pressed against the edges of the end and peripheral walls of the body, a partially open position at which the closure is spaced from the rear edge of the peripheral wall of the body sufficiently to permit advancement of second sheet 62 from the container and a fully open position shown in FIG. 3 at which a container 64 holding the image-receiving sheet may be loaded into the body of container 88.

Body 90 of container 88 is mounted in the housing on forward section 12 on two pairs of pivotal links 94 which allow the container body to move linearly and arcuately with respect to the forward housing section between the closed and fully open positions of container 88. In the closed position of the housing, a member 96 provided on the rear housing section engages body 90 and retains the body in a substantially fixed position. Member 96 is constructed to engage the body of the container during pivotal movement of the rear housing section from its open to its closed position to move the container body from the fully open position shown in FIG. 3 to the fixed position shown in FIG. 2. A spring 98 is provided within the forward housing section for urging container 88 into its fully open position when rear housing section 14 is pivoted into an open position. Another spring (not shown) may be provided coupled between body 90 and closure 92 for urging the closure into an open position.

The camera includes a drive mechanism operable manually for rotating rolls 74 and 76 to advance successive sections of the image-recording and second sheets between the rolls; and for holding closure 92 closed and allowing it to open to the partially open position to permit movement of the second sheet from container 88. In the form shown, the drive mechanism comprises a manually engageable crank 100 keyed to a shaft 102 extending through upper side wall 22. Crank 100 is pivotable from an initial position manually in one direction through approximately 180° to a second or terminal position to permit closure 92 to move into a partially open position and advance predetermined lengths of the two sheets between rolls 74 and 76 from the camera housing; and is pivotable in the opposite direction to its original or initial position to close container 88 by urging the closure against the body. Shaft 102 extends through the camera housing between end wall 28 and closure 92 and is journaled in lower side wall 24. As a means for urging closure 92 against body 90 a pair of cams 104 are provided on shaft 102. Cams 104 are designed to hold the closure against the body in the first or initial position of crank 100 so that when the crank is pivoted from its initial position, the pressure exerted by cams 104 on closure 92 is relieved and is exerted again when the crank and shaft are returned to their initial position. The pressure on closure 92 by cams 104 is relieved during the initial portion, e.g., 60°, of rotation of shaft 102 and crank 100. During the remaining or terminal portion e.g., 120°, of rotation of shaft 102 and crank 100, rolls 74 and 76 are rotated sufficiently to advance an exposed area of image-recording sheet 52 from a position between rear wall 38 and rear wall 30 into superposition with an equal length of second sheet 62 which is withdrawn from containers 64 and 88, press the two lengths of the sheets into superposition to form a sandwich and advance the sandwich from the camera through opening 78, while moving another length of sheet 52 into position for exposure between rear walls 30 and 38. The means for rotating rolls 74 and 76 include gears 106 and 108 mounted on the shafts 80 of, respectively, rolls 74 and 76; a drive gear 110 mounted on shaft 102 for movement with respect to the shaft; and gears 112 and 114 meshed, respectively, with drive gear 110 and gear 108 on roll 76. A support member 116 is provided within the housing mounted on upper side wall 40 for supporting drive gear 110 and transfer gears 112 and 114. Drive gear 110 is coupled with shaft 102 by a conventional one-way clutch which provides for rotation of gear 110 in a clockwise direction (viewing FIG. 4) during rotation of shaft 102 and crank 100 in a clockwise direction from their initial position; and allows gears 110 and rolls 74 and 76 to remain stationary during the counterclockwise, return movement of the crank and shaft to their initial position. The one-way clutch, in the form shown, comprises a ratchet and pawl type of device comprising a ratchet wheel 118 keyed to shaft 102 having a single shoulder and pawls in the form of pins 120 for engaging the shoulder mounted 180° apart on gear 110 for axial movement and biased axially toward wheel 118. Wheel 118 is designed to move through a predetermined distance, for example 60°, from its initial position before engaging one of pins 120 to rotate gear 110 thereby allowing closure 92 to move into a partially open position before advancement of the sheets is commenced.

The camera also includes means for closing exit slot 78 and automatically opening the exit slot to permit advancement of the sheets through the slot and severing successive sections of the sandwich, each including an exposed and processed area of the image-recording sheet, from other portions of the sheets remaining within the camera housing. These last-mentioned means comprise a cutter bar 122 mounted between section 46 of rear wall 38 and a pair of backing plates 124 and 126 secured to rear wall 38 adjacent opposite sides of exit slot 78. Cutter bar 122 is movable between a closed position shown in FIG. 2 in which it extends across and in closing relation to exit slot 78 and an open position (FIG. 3) at which one edge, which is sharpened, is located to one side of the exit slot. The edge of backing plate 126 closest slot 78 is sharpened and cooperates with the sharpened edge of cutter bar 122 to form a shear for severing the sandwich. As means for reciprocating cutter bar 122 into a closed position, a pair of cranks 128 are provided mounted for pivotal movement intermittent their ends on upper and lower side walls 22 and 24. Each of cranks 128 is provided with a slot 130 in its rear end for engaging a pin 132 projecting from an end of cutter bar 122. Cams 134 are mounted on shaft 102 in engagement with the opposite ends of cranks 128 for pivoting the cranks so as to move the cutter bar into its closed position. Springs 136 coupled with crank 128 bias the cutter bar into an open position and cams 134 are designed to permit the cutter bar to move into an open position during the initial (60°) clockwise rotation of shaft 102 from its initial position and to engage the cranks and move the cutter bar into its closed position during the terminal portion of the return movement of shaft 102 to its initial position.

It will be seen that rotation of crank 100 in a clockwise direction through 180° from its initial position permits closure 92 of container 88 to move into a partially open position and cutter bar 122 to move into an open position and thereafter rotates rolls 74 and 76 sufficiently to advance a predetermined length of the sheets into superposition and from exit slot 78. A torsion spring 138 may be provided coupled between shaft 102 and the camera housing for automatically returning the shaft to its initial position thereby closing container 88 and moving cutter bar 122 into its closed position. The cutter bar, during movement into its closed position, severs the portions of the sandwich extending from the housing through exit slot 78 from the remainder of the sandwich and sheets located within the housing between rolls 74 and 76. Since the operation of the camera will most probably require the use of both of the operator's hands, that is, one hand to hold the camera and the other to turn crank 100, it is desirable to have the severed portion of the sandwich remain attached to the camera so that it does not fall. This is accomplished by providing cutter bar 122 and/or backing plate 126 with a sharpened cutting edge which is shorter than the width of the sandwich with the result that the sandwich is severed only part way across and a small portion of the sandwich at one edge is left to attach the severed portion of the sandwich to the portion of the sandwich remaining within the camera. This connecting portion of the sandwich at one edge thereof is preferably quite small, so that it may be torn or ruptured very easily, and is sufficient only to connect the two sections of the sandwich.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera including a housing comprising two sections movable relative to one another between operative and inoperative positions, exposure means mounted on said housing and means for locating successive portions of an image-recording sheet in position for exposure, in combination:

means defining an opening in one of said housing sections through which successive portions of a sandwich comprising said image-recording sheet and a second sheet superposed therewith can be advanced from said housing;

a pair of pressure-applying members, at least one of which comprises a roll, mounted in juxtaposition within said housing on said one housing section adjacent said opening with adjoining portions of said members aligned with said opening;

drive means including a drive member engageable outside of said housing and movable through a predetermined distance between a first position and a second position;

said drive means including means coupling said drive member with said roll for rotating said roll in engagement with said sandwhich to advance a predetermined length if said sandwich from said housing through said opening during and in response to movement of said drive member from said first to said second position;

means within said housing on the other of said housing sections for holding a coil of said second sheet comprising an open container for holding said coil and a closure for said container, said closure and said container being mounted on said other housing section for movement relative to one another and said other housing section;

engagement means mounted on said one housing section for engaging and holding said container in a substantially fixed position when said housing sections are in said operative position, said closure being movable relative to said container between a closed position and a partially open position at which said closure is displaced from said container sufficiently to permit withdrawal movement of said second sheet from said container;

said driving means including means for retaining said closure in said closed position when said drive member is in said first position and releasing said closure when said drive member is displaced from said first position;

said container for said closure being movable relative to said other housing section to a fully open position permitting introduction of a coil of said second sheet into said container when said housing sections are in said inoperative position;

means within said other housing section for urging said container and closure into said fully open position;

said engagement means being constructed for moving said container and said closure into said partially open position during movement of said housing sections from said inoperative to said operative position; and means for guiding successive exposed portions of said image-recording sheet into superposition with successive portions of said second sheet between said pressure-applying members.

2. The camera of claim 1 in which said drive means include means for releasing said closure to move into said partially open position during the initial portion of movement of said drive member from said first position to said second position, rotating said drive roll to advance said sandwich from said housing during the terminal portion of said movement of said drive members from said first to said second position and moving said closure into said closed position during the terminal portion of movement of said drive member into said first position from said second position.

3. The camera of claim 1 in which said container and said closure are disposed apart from one another and at least partially outside of said other housing section when in said fully open position.

4. The camera of claim 3 in which said closure is mounted on said container for linear movement relative to said container between said closed and partially open positions, and said container and said closure are mounted for pivotal and arcuate movement relative to one another and said other housing section between said partially open and fully open positions.

5. A camera as defined in claim 1 comprising a cutting member mounted on said one housing section for movement between a first position at which said cutting member extends across said opening in closing relation thereto and a second position to one side of said opening permitting movement of said sandwich through the opening, said cutting member being constructed for cutting said sandwich during movement from said second to said first position; and said drive means including means for moving said cutting member from said first position to said second position thereof during and in response to the initial portion of said movement of said drive member from said first to said second position thereof and moving said cutting member from said second position to said first position thereof to cut said sandwich during and in response to movement of said drive member from said second to said first position thereof.

6. In a camera including a housing comprising two sections movable relative to one another between open and closed positions, exposure means mounted on said housing and means within said housing for locating successive portions of an image-recording sheet in position for exposure, in combination:

means defining an opening in one of said housing sections through which successive sections of a sandwich comprising said image-recording sheet and a second sheet superposed therewith can be withdrawn from said housing;

a pair of pressure-applying members, at least one of which comprises a roll, mounted in juxtaposition within said housing on said one housing section adjacent said opening;

drive means including a drive member engageable exterior of said housing and movable through a predetermined distance between a first position and a second position;

said drive means including means coupling said drive member with said roll for rotating said roll in engagement with said sandwich to advance a predetermined length of said sandwich from said housing through said opening in response to a terminal portion of the movement of said drive member from said first to said second position;

a container mounted within said housing on the other of said sections, said container comprising a body providing an open chamber for receiving and holdin a coil of said second sheet and a closure for said body, said body and said closure being movable with respect to one another between a closed position in which said container is substantially sealed and a partially open position at which said closure is displaced from said body sufficiently to permit movement of said second sheet from said container between said body and closure;

said body and said closure being mounted on said other housing section for movement with respect to one another and said other housing section from said partially open position to a fully open position at which said closure is spaced from said body so as to permit loading of a coil of said second sheet into said body;

resilient means within said housing on said other housing section for urging said container into said fully open position when said housing sections are moved into said open position thereof;

engagement within said housing on said one housing section for moving said container into said partially open position when said housing sections are moved into said closed position thereof;

means coupled with said drive member for moving said closure relative to said body into said closed position of said container during the terminal portion of movement of said drive member from said second to said first position and allowing said closure to move from said closed to said partially open position thereof during the initial portion of movement of said drive member from said first to said second position; and means for guiding successive exposed portions of said image-recording sheet into superposition with successive portions of said second sheet between said pressure-applying members.

7. The camera of claim 6 in which said closure is mounted on said body for linear movement relative to said container between said closed and partially open positions, and said body and said closure are mounted for pivotal and arcuate movement relative to one another and said other housing section between said partially open and fully open positions.

8. The camera of claim 6 in which said drive means are mounted on said other housing section and include a cam coupled with said drive member for engaging and urging said closure into said closed position thereof.

9. A camera as defined in claim 6 comprising a cutting member mounted on said one housing section for movement between a first position at which said cutting member extends across said opening in closing relation thereto and a second position to one side of said opening permitting movement of said sandwich through said opening, said cutting member being constructed for cutting said sandwich during movement from said second to said first position thereof; and said drive means including means for moving said cutting member from said first position to said second postion thereof during and in response to the initial portion of said movement of said drive member from said first to said second position thereof and moving said cutting member from said second to said first position thereof to cut said sandwich during and in response to movement of said drive member from said second to said first position thereof.

10. The camera of claim 9 in which said cutting member is positioned for severing said sandwich along a transverse line extending from one lateral edge of said sandwich to a point closely adjacent the opposite lateral edge of said sandwich.

No references cited.

JOHN H. HORAN, *Primary Examiner.*